(12) United States Patent
Shingaki

(10) Patent No.: US 6,279,273 B1
(45) Date of Patent: Aug. 28, 2001

(54) TERMITE SHIELDING STRUCTURE OF UNDERFLOOR PORTIONS OF A BUILDING

(75) Inventor: Morinobu Shingaki, Okinawa (JP)

(73) Assignee: Shinyo Co., Ltd., Okinawa (JP)

( * ) Notice: Subject to any disclaimer, the term of this patent is extended or adjusted under 35 U.S.C. 154(b) by 0 days.

(21) Appl. No.: 09/449,639

(22) Filed: Nov. 30, 1999

(30) Foreign Application Priority Data

Jul. 30, 1999 (JP) .................................................. 11-217238

(51) Int. Cl.[7] ................................ E04B 1/72; A01M 1/24
(52) U.S. Cl. .......................... 52/101; 52/220.8; 52/294; 52/414
(58) Field of Search .................................... 52/101, 220.8, 52/250, 294, 414

(56) References Cited

U.S. PATENT DOCUMENTS 2,981,025 * 4/1961 Woodsson ............................ 52/101 X
3,209,485 * 10/1965 Griffin ................................ 52/101 X
5,417,017 * 5/1995 Toutountzis ......................... 52/250 X

* cited by examiner

Primary Examiner—Christopher T. Kent
(74) Attorney, Agent, or Firm—Arent Fox Kintner Plotkin & Kahn, PLLC

(57) ABSTRACT

A termite shielding structure of underfloor portions of a building wherein a floor mold slab 3 and a berm 31 of reinforced concrete are integrally formed on sleeve crowns of underground beams 12 of mat foundations 1 made of reinforced concrete, wherein a termite shielding chemicals bucket 7 which is a long cylindrical body whose interior is filled with termite shielding chemicals is embedded into the floor mold slab 3 so as to pierce therethrough in a vertical manner, and wherein a pipe 4 that is used for delivery of plumbing water, gas or other fluids or for guiding electric wiring cables 5 is connected to the termite shielding chemicals bucket 7 such that these respectively extend on both upper and lower sides of the floor mold slab 3. With this arrangement, termites can be prevented from entering the underfloor portion 6 of the building from piping portions piercing through the floor mold slab 3.

4 Claims, 1 Drawing Sheet

TERMITE SHIELDING STRUCTURE OF UNDERFLOOR PORTIONS OF A BUILDING

BACKGROUND OF THE INVENTION

The present invention relates to a termite shielding structure of underfloor portions of a building for preventing termites from entering the underfloor portions from underground.

In case ventilation of underfloor portions of a building is poor, it is often the case that the building is eroded by termites. Termites, with the exception of some minor kinds thereof, favorably breed on temperate and humid soil and exist by absorbing moisture from nature. By entering underfloor portions from cracks in foundations or peripheries of underground piping from soil in the periphery of the building, the termites erode wooden materials constituting the building or even furniture.

Principal measures that have conventionally been taken to prevent termites from entering or to get rid of them are chemical measures employing chemicals such as insecticides or termite shielding chemicals. More particularly, such measures include directly dispersing insecticides at places where termites inhabit, killing the termites either directly or indirectly by inducing the termites to baits, or utilizing wooden materials that preliminarily underwent termite shielding treatments by using chemicals. There are also taken measures for keeping termites away from wooden material portions of a building by forming a barrier through dispersing termite shielding chemicals into soil in the periphery of the building or laying a termite shielding sheet on a ground surface corresponding to underfloor portions of the building. Floor slab concrete may be poured above the surface of the soil on which the termite shielding chemicals have been dispersed or above the termite shielding sheet that has been laid on the soil surface for suppressing purposes.

However, while such chemical measures that are dependent on chemical efficacy of termite shielding chemicals or insecticides are capable of performing termite shielding treatments or getting rid of them in a relatively short time when and where required, it cannot be avoided that the toxicity of the chemicals badly affect the peripheral environment as well as other creatures. That is, it may be that a person performing chemical treatments may breathe in chemicals or that chemicals that have been dispersed into the soil and to underfloor portions are spread to harm the health of residents. Wooden materials that have undergone termite shielding treatments through chemicals are limited in their purposes when being reused, and they may pollute the environment when being disposed. Further, since the chemical efficacy of chemicals vanish after a short term, it will be necessary to repeatedly perform chemical treatments within effective periods so that such a measure is not an economical one in terms of trouble and costs in a long-term aspect.

PURPOSE AND SUMMARY OF THE INVENTION

The present invention has been made in view of these facts, and it is a purpose of the invention to provide a termite shielding structure of underfloor portions of a building that is capable of preventing termites from entering underfloor portions of a building through a physical arrangement whereby it is enabled to minimize the dependency on chemicals that may lead to environmental pollution or damages to health and to simplify maintenance and control of the structure.

For achieving these purposes, the termite shielding structure of underfloor portions of a building according to the present invention is arranged in that a floor mold slab of reinforced concrete is integrally formed with underground beams of mat foundations made of reinforced concrete such that bar arrangements of the slab are connected to bar arrangements of the underground beams on sleeve crown portions thereof with these sleeve crown portions of the underground beams forming construction joints. Since the underground beams of the mat foundations and the floor mold slab are arranged to be of continuous structure integrated by reinforced concrete, portions that are divided by the underground beams are completely shielded at their upper portions through the floor mold slab. Further, since the construction joints of concrete form horizontal surfaces of sleeve crown portions of the underground beams, concrete sufficiently fits against these construction joints so as to decrease the occurrence of cracks. Thus, possibilities that termite paths be formed around the floor mold slab are minimized and termites can be prevented from entering above the floor mold slab on the indoor side.

It is preferable that the underground beams and a berm be formed in an integral manner with the floor mold slab. The berm is a portion that is formed in an overhanging manner to the outdoor side along the outer periphery of the underground beams, and by integrating the berm with the underground beams and the floor mold slab, there is formed a barrier for preventing termites from climbing the outer peripheral portions of the underground beams and entering underfloor portions through underfloor ventilation openings or the like that are formed at outer peripheral walls. Even if termite paths were formed on the surface of the berm, traces may be detected more easily so that extermination treatments may be performed at an early stage.

The termite shielding structure of underfloor portions of a building according to the present invention is further arranged in that a termite shielding chemicals bucket is embedded into the floor mold slab so as to pierce therethrough in a vertical manner, the bucket being arranged by filling termite shielding chemicals into an interior of a long cylindrical body whose upper end is open or openable, and in that pipes that are used for delivery of plumbing water, gas or other fluids or for guiding electric wiring cables are connected to the termite shielding chemicals bucket such that these respectively extend on both upper and lower sides of the slab. That is, by connecting pipes which are respectively arranged above and below the floor mold slab with termite shielding chemicals bucket being filled with termite shielding chemicals and interposed between, the chemical efficacy can be focused at portions at which the pipes pierce through the floor mold slab, such that termites can be prevented from entering above the floor mold slab through these piercing portions. By making the upper portions of the termite shielding chemicals bucket open above the floor mold slab, termite shielding chemicals may be supplemented to maintain long-term termite shielding effects.

The termite shielding chemicals bucket may be a cylindrical body assuming a circular, square or any other polygonal section. Its upper end may be continuously open, but it is more preferable to provide an openable/closable lid that may be opened when termite shielding chemicals are supplemented into the termite shielding chemicals bucket. The termite shielding chemicals may be chemicals of aromatic group such as naphthalene or any other known chemicals of boric acid group, organic chloride group or organic phosphoric acid group, and the chemicals to be used in the present invention are not limited to any particular kind of chemicals. Further, the chemicals may be in any form such as powder, grains or liquid unless filling and supplementing into the termite shielding chemicals bucket becomes not particularly inconvenient.

The termite shielding structure of underfloor portions of a building according to the present invention is further characterized in that a floor is formed above the floor mold slab wherein the floor is provided with an underfloor portion inspecting opening that is at any time openable/closable from at least the indoor side. According to this invention, underfloor portions can be inspected at any time through this underfloor inspecting opening even after completion of the building, and it is further enabled to perform supplementation of termite shielding chemicals and to confirm whether no leakage from the piping has occurred.

In this manner, the termite shielding structure of underfloor portions of a building according to the present invention is arranged in that underfloor portions that are enclosed by underground beams of mat foundations are physically shielded by a floor mold slab of reinforced concrete, and by interposing a termite shielding chemicals bucket at a portion at which piping pierce through the floor mold slab, there is no space left in the periphery of the mat foundations for the termites to form paths for entering. Since entering paths for termites are shielded through reinforced concrete, it can be expected for semi-permanent shielding effects once appropriate installation of concrete is performed. Since such effects are not dependent on chemical efficacy of termite shielding chemicals that are dispersed into the soil or of termite shielding sheets that are laid on the soil surface, there is no fear of pollution of soil or damages to health owing to these chemicals. In addition, by supplementing termite shielding chemicals into the termite shielding chemicals bucket at suitable intervals, stable and long lasting termite shielding effects can be achieved also at portions at which piping pierce through the floor mold slab. The arrangement of the underfloor inspecting opening further simplifies the maintenance and control of the structure.

DESCRIPTION OF THE PREFERRED EMBODIMENTS

Figure 1:
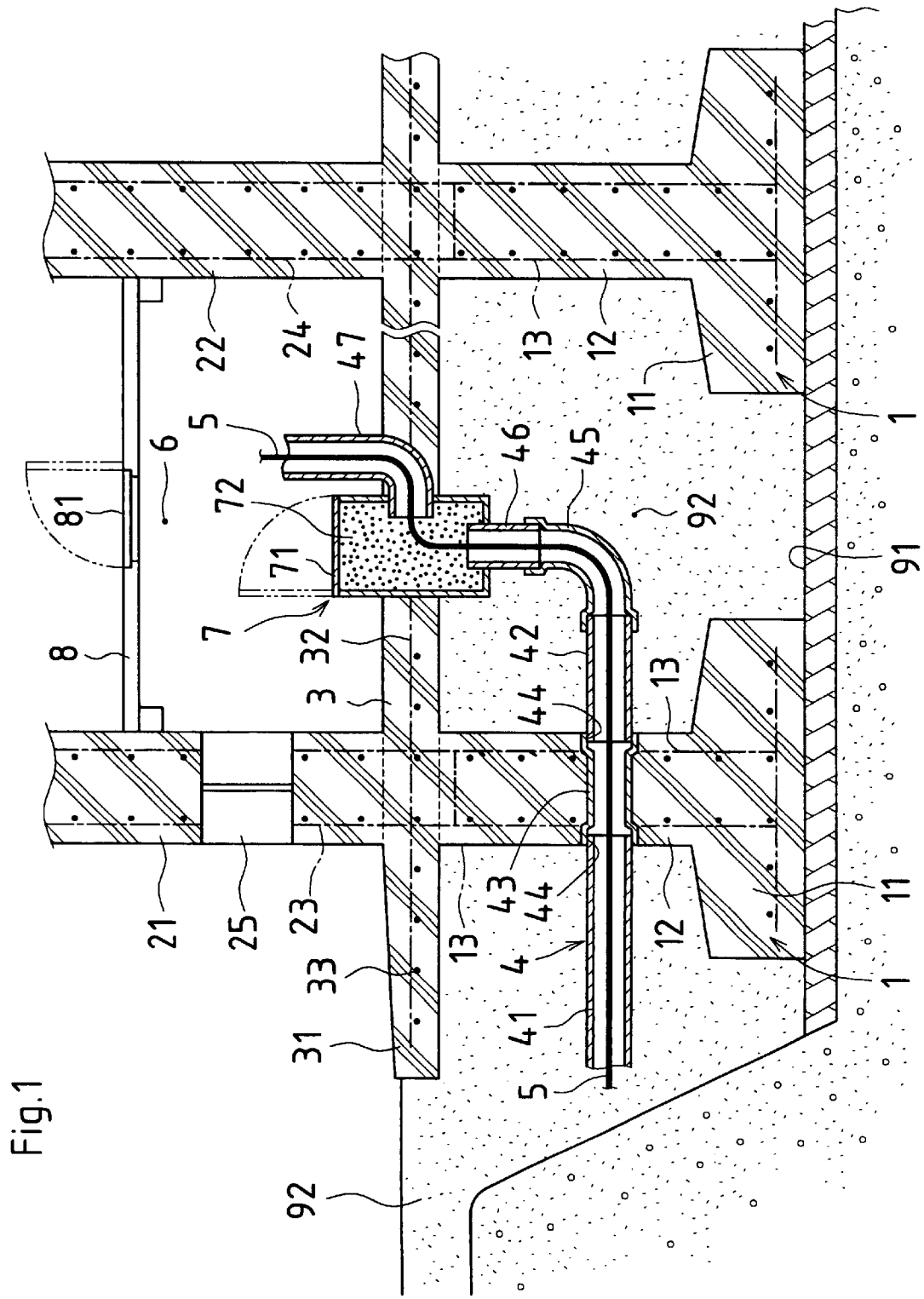
FIG. 1 is a longitudinal sectional view showing a periphery of the mat foundations, floor mold slab and piping portion piercing therethrough according to one embodiment of the termite shielding structure of underfloor portions of a building according to the present invention.

Preferred embodiments of the present invention will now be explained by referring to the drawing.

FIG. 1 shows an overall structure of the termite shielding structure of underfloor portions of a building according to the present invention.

Mat foundations 1 of reinforced concrete each comprised of a footing portion 11 and underground beam portion 12 are assembled above a ground 91 that has been excavated and treated through broken stone foundation. The mat foundations 1 are assembled to extend along an outer periphery of a building in a successive manner, and are also arranged at portions in that they divide an interior of the building at suitable intervals. Above these mat foundations 1, there are established outer peripheral walls 21 and principal indoor walls 22.

The periphery of the mat foundations 1 is filled back with soil 92 up to positions of sleeve crowns of the underground beams 12, and a floor mold slab 3 of reinforced concrete is formed thereabove. The floor mold slab 3 is formed so as to extend over the whole outer periphery of the mat foundations 1 and further in an overhanging manner to the outdoor side (left-hand side in the drawing) so that the overhanging portion forms the berm 31. A slope slightly declining towards the outdoor side is provided on the surface of the berm 31. Bar arrangements 13 of the underground beams 12 and bar arrangements 23, 24 of the outer peripheral walls 21 and indoor walls 22 are structured in that they are connected to each other to assume a continuous structure. Bar arrangements 32, 33 are also formed for the floor mold slab 3 and the berm 31 through reinforcements or wire mesh, and these bar arrangements 32, 33 being connected to the bar arrangements 23, 24 of the outer peripheral walls 21 and inner walls 22, the underground beams 12, the outer peripheral walls 21, the indoor walls 22, the floor mold slab 3 and the berm 31 are formed in an integral manner.

Underground and below the floor mold slab 3, vinyl chloride pipes 4 that are used, for instance, as guiding pipes for electric wiring cables 5 are arranged to pierce through the underground beams 12 of the mat foundations 1. These vinyl chloride pipes 4 communicate between the interior and the exterior of a building by connecting straight pipes 41, 42 that are located on the indoor side and outdoor side to both pipe ends of the underground beam piercing pipes 43 embedded in the underground beams 12. Each of the underground beam piercing pipes 43 is formed in that a vinyl chloride pipe 4 is cut to be short and in that connecting portions 44, 44 for joints are provided at both end portions thereof to assume a pipe length that is identical to the width of the underground beam 12, arranged within the underground beam 12 to be transverse with respect to the extending direction of the underground beam 12, and embedded and fixed at the concrete of the underground beam 12 with both pipe ends being aligned at both lateral surfaces of the underground beam 12. The connecting portion 44 of the underground beam piercing pipe 43 is formed of a threaded (not shown in the drawings) socket made of vinyl chloride.

An elbow pipe 45 is connected to another pipe end of the straight pipe 42 that extends from the underground beam piercing pipe 43 to the indoor side, and another upward rising straight pipe 46 is further connected to the elbow pipe 45. An upper end of the straight pipe 46 is connected to a bottom portion of the termite shielding chemicals bucket 7 that has been embedded and fixed at the floor mold slab 3.

The termite shielding chemicals bucket 7 is a bottomed long cylindrical body of vinyl chloride resin, and is embedded and fixed at the concrete of the floor mold slab 3 in a manner that it pierces through the floor mold slab 3 in a vertical manner. An openable/closable lid 71 is provided at the upper portion of the termite shielding chemicals bucket 7, and the interior thereof is filled with termite shielding chemicals 72.

The straight pipe 46 is connected to the bottom of the termite shielding chemicals bucket 7 and by passing through these points of connection, electric wiring cables 5 are drawn into the interior of the termite shielding chemicals bucket 7. Further, an underfloor drawing pipe 47 formed of another vinyl chloride pipe 4 is connected in a horizontal direction at a lateral surface in the proximity of substantially the center in the height direction of the termite shielding chemicals bucket 7, and this underfloor drawing pipe 47 being further bent upward, it is extended to an underfloor portion 6. The electric wiring cables 5 that has been drawn into the termite shielding chemicals bucket 7 from the ground side is drawn out via the underfloor drawing pipe 47 and is further connected to electric wiring or the like (not shown) in the underfloor portion 6.

The termite shielding structure of underfloor portions of a building is constructed by performing the following steps.

First, a framework for the mat foundations 1 is erected onto ground 91. At suitable positions corresponding to portions of underground beams 12 of the mat foundations 1, the underground beam piercing pipes 43 are disposed so as to be transverse with respect to the extending direction of the mat foundations 1 and are attached to the bar arrangement 13 of the underground beam 12 by temporal fastening. Since the length of each of the underground beam piercing pipes 43 is identical to the width of the underground beam 12, attachment is effected with both pipe ends being closely fitted at the framework of the underground beam 12. In addition, bar arrangements 23, 24 of the outer peripheral walls 21 and indoor walls 22 that are established thereabove are connected to upper portions of the bar arrangement 13 of the underground beams 12.

Concrete is then installed into the framework of the mat foundations 1 and the underground beam piercing pipes 43 are embedded and fixed into the concrete. After removing the framework upon curing of the concrete, connecting portions 44, 44 at both pipe ends of the underground beam piercing pipes 43 are open to both lateral sides of the underground beam 12 so that outdoor side and indoor side straight pipes 41, 42 may then be connected thereto. To the outdoor side straight pipe 41, an outdoor feeder pipe (not shown) or similar may be suitably connected. To the indoor side straight pipe 42, there are connected the elbow pipe 45 and straight pipe 46, and the straight pipe 46 is further connected to the bottom portion of the termite shielding chemicals bucket 7. The termite shielding chemicals bucket 7 is temporally fixed at a specified position at which it pierces through the floor mold slab 3, and the underfloor drawing pipe 47 is connected to the lateral side thereof.

After generally forming the vinyl chloride pipes 4 so as to be communicated from outdoors and indoors through to the underfloor portion 6, soil 92 is filled back into the periphery of the mat foundations 1 up to sleeve crowns of the underground beams 12. After assembling bar arrangements 32, 33 of the floor mold slab 3 and the berm 31 above sleeve crown positions of the underground beams 12 and connecting these also to the bar arrangements 23, 24 of the outer periphery walls 21 and indoor walls 22, concrete is installed. With this arrangement, the floor mold slab 3 and the berm 31 may be formed while further embedding and fixing the termite shielding chemicals bucket 7 into the concrete of the floor mold slab 3, and the periphery thereof is surrounded by the concrete.

Thereafter, frameworks for the outer periphery walls 21 and indoor walls 22 are erected, and by installing concrete within the frameworks, the outer periphery walls 21 and indoor walls 22 are formed. Then, respective piping of the underfloor portion 6 (not shown) are connected to the upper pipe end of the underfloor drawing pipe 47 that has been drawn out from the termite shielding chemicals bucket 7 so as to be extended to respective indoor portions.

According to the termite shielding structure of underfloor portions of a building of the above arrangement, the floor mold slab 3 is made to be a reinforced concrete slab including bar arrangements 32, and since the bar arrangements 32 are connected to bar arrangements 13 of the underground beams 12 via the bar arrangements 23, 24 of the outer peripheral walls 21 and indoor walls 22, it can be obtained for an arrangement in which the underground beams 12 of the mat foundations 1 and the floor mold slab 3 are integrated in a tight manner through the reinforced concrete. Further, since the construction joints between the underground beams 12 and the floor mold slab 3 form the sleeve crown surfaces of the underground beams 12, concrete is made to sufficiently fit also at these construction joints. Thus, cracks can be prevented from being formed between the underground beams 12 and the floor mold slab 3 unlike with conventional structures in which floor slab concrete is simply filled into portions surrounded by the underground beams 12, and it can be achieved for an arrangement that is also stable against earthquakes. Therefore, there is little fear that termite paths be formed at lateral side portions of the underground beams 12 or at connecting portions between the underground beams 12 and the floor mold slab 3, and termites can be almost completely prevented from entering from the ground to above the floor slab mold 3.

Further, since the berm 31 is provided in an overhanging manner on the outdoor side of the underground beams 12, the berm 31 can serve as a barrier against termites that try to climb the outer periphery portion of the underground beams 12 and enter the underfloor portions through the underfloor ventilation opening 25 formed at the outer peripheral walls 21. Since termites that intend to enter underfloor portions need to approach the outer peripheral walls 21 from the surface of the berm 31, traces are left on the surface of the berm 31 that is made of concrete. Thus, it is made easier to detect traces of termites than cases in which no berm 31 is provided at the outdoor side of the building. Also, in case termites should, by any chance, approach the proximity of the outer peripheral walls 21, it is enabled to get rid of them at an early stage. It is preferable that the berm 31 be provided to overhang 10 cm and up on the outdoor side, and in case an aperture such as the underfloor ventilation opening 25 is provided on the outer peripheral wall 21, it is preferable that the aperture be formed such that its lower end is about 3 cm and up higher than the surface of the berm 31.

Since the underground beam piercing pipes 43 and termite shielding chemicals bucket 7 are respectively embedded and fixed within the concrete of the underground beams 12 and floor mold slab 3 at portions at which piping pierce through the underground beams 12 and floor mold slab 3, concrete is made to fit also at peripheral portions thereof such that the piercing portions are reliably shielded.

Especially at portions at which piping pierce through the floor mold slab 3 where piping above and below the floor mold slab 3 are connected via the termite shielding chemicals bucket 7, chemical efficacy of termite shielding chemicals 72 filled within the termite shielding chemicals bucket 7 may be focused at the points of connection so as to reliably prevent termites from entering through these points of connection above the floor mold slab 3. Since the termite shielding chemicals bucket 7 assumes a long and slender cylindrical body, the amount of utilized termite shielding chemicals 72 may be kept small. Thus, this structure is not only by far more economical than methods in which termite shielding chemicals are spread over the entire soil but also is the possibility of environmental pollution and damages to health quite small.

It should be noted that similar effects may be achieved also if the horizontal portion of the underfloor drawing pipe 47 be exposed above the floor mold slab 3 at the time of embedding and fixing the termite shielding chemicals bucket 7 into the floor mold slab 3. Since the termite shielding chemicals bucket 7 is disposed into the floor mold slab 3 through simple construction, it is also economical in terms of construction.

In case the piping that pierce through the floor mold slab 3 are pipes that are used for delivery of fluid such as water or gas, such fluid is made to pass through the termite shielding chemicals bucket 7 in a condition in which the pipes above and below the floor mold slab 3 (i.e. the underfloor drawing pipe 47 and the straight pipe 46, respectively) are connected. Alternatively, it is also possible to employ flexible delivery pipes as pipes for delivery of water or gas and to insert these delivery pipes into a guide pipe that is connected to the termite shielding chemicals bucket 7 (e.g. the vinyl chloride pipe 4). The present invention also covers these connection modes.

By the provision of the openable/closable lid 71 at the upper portion of the termite shielding chemicals bucket 7 as shown in the drawing, it can be prevented for decreases in chemical efficacy owing to e.g. volatilization of the termite shielding chemicals 72. Then, by supplementing termite shielding chemicals 72 through the opened lid 71 at suitable periods, it can be achieved for a long-term maintenance of the termite shielding effects.

Further, in case the floor 8 of the building is provided with an underfloor inspecting opening 81 that is openable/closable at any time from the indoor side, inspection of the underfloor portion 6 or supplementing operations of termite shielding chemicals 72 can be further made easy. Since termites prefer moisture, occurrence of leakage of water from piping such as plumbing that are arranged at the underfloor portion 6 can be detected at an early stage so that repair of piping or measures for termite shielding may be performed. It is preferable that the openable/closable portion of the underfloor inspecting opening 81 be conspicuous when seen from the indoor side such that residents of the building pay attention to inspection of the underfloor portion 6 on the everyday basis.

What is claimed is:

1. A termite shielding structure of underfloor portions of a building wherein a floor mold slab of reinforced concrete is integrally formed with underground beams of mat foundations made of reinforced concrete such that bar arrangements of the slab are connected to bar arrangements of the underground beams on sleeve crowns thereof with these sleeve crown portions of the underground beams forming construction joints.

2. A termite shielding structure of underfloor portions of a building wherein a floor mold slab and a berm of reinforced concrete are integrally formed with underground beams of mat foundations made of reinforced concrete such that bar arrangements of the slab and the berm are connected to bar arrangements of the underground beams on sleeve crown portions thereof with these sleeve crowns of the underground beams forming construction joints.

3. The termite shielding structure of underfloor portions of a building according to claim 1 or 2, characterized in that a termite shielding chemicals bucket is embedded into the floor mold slab so as to pierce therethrough in a vertical manner, the bucket being arranged by filling termite shielding chemicals into an interior of a long cylindrical body whose upper end is open or openable, and in that pipes for delivering plumbing water, gas or other fluids or guiding pipes for guiding electric wiring cables are connected to the termite shielding chemicals bucket such that these respectively extend on both upper and lower sides of the slab.

4. The termite shielding structure of underfloor portions of a building according to claim 3, wherein a floor is formed above the floor mold slab and wherein the floor is provided with an underfloor inspecting opening that is at any time openable/closable from at least the indoor side in the vicinity of the termite shielding chemicals bucket.

* * * * *